Nov. 13, 1956  C. F. MATTKE  2,770,163
NON-INTERMITTENT PROJECTOR FOR MOTION PICTURES
Filed Dec. 19, 1950  2 Sheets-Sheet 1

INVENTOR
C. F. MATTKE
BY Hugh S. Wertz
ATTORNEY

Nov. 13, 1956  C. F. MATTKE  2,770,163
NON-INTERMITTENT PROJECTOR FOR MOTION PICTURES
Filed Dec. 19, 1950  2 Sheets-Sheet 2
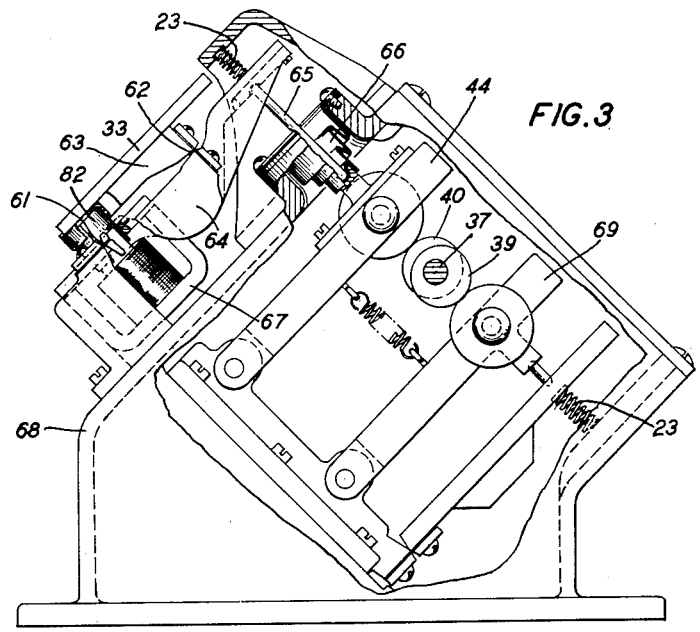
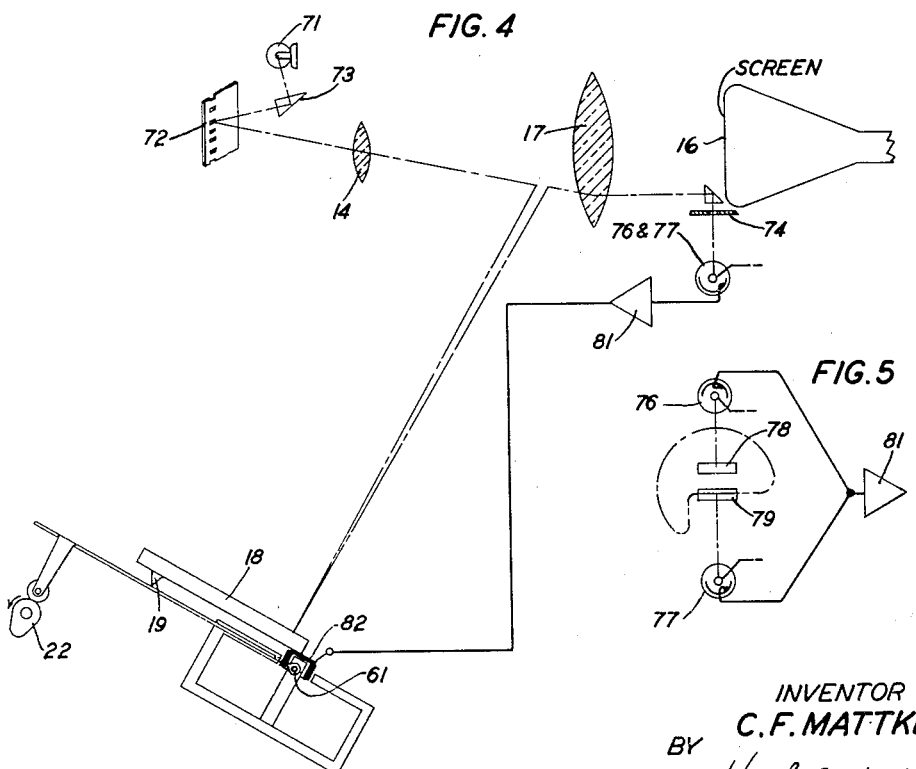
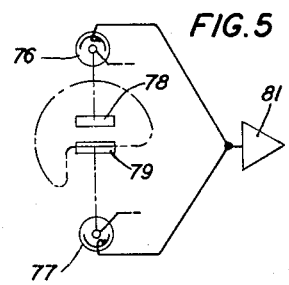
INVENTOR
C. F. MATTKE
BY
Hugh S. Wertz
ATTORNEY

United States Patent Office

2,770,163
Patented Nov. 13, 1956

2,770,163
NON-INTERMITTENT PROJECTOR FOR MOTION PICTURES

Charles F. Mattke, Fanwood, N. J., assignor to Bell Telephone Laboratories, Incorporated, New York, N. Y., a corporation of New York Application December 19, 1950, Serial No. 201,660

6 Claims. (Cl. 88—16.8)

This invention relates to a continuous projector for motion pictures.

An object of the invention is to provide an improved optical projector whereby stationary and continuously moving optical patterns may be produced, one from the other.

It is another object of this invention to provide an improved optical arrangement which can be used either for television signal generation or recording.

In an application of the present inventor, Serial No. 124,403, filed October 29, 1949, now Patent 2,718,549, granted September 20, 1955, there is disclosed a special film projector by means of which the frames of a continuously moving motion picture film are projected as stationary images on a viewing screen and the illusion of scene or subject motion is produced as images of successive frames are merged on the viewing screen. This projector compensates for the motion of the film by employing a rotating crown of mirrors in the optical path. When viewed through the crown of mirrors, the film motion appears to be stopped so that successive frames blend into and out of view without flicker. This projector, however, necessitates very close mechanical tolerances in its operation, and an extremely high degree of precision is therefore required in its construction. Of special consequence is the disturbing effect of either horizontal or vertical displacement of the film from its proper instantaneous position. In an application of Robert E. Graham and the present inventor, Serial No. 167,872, filed June 13, 1950, now Patent 2,666,356 granted January 19, 1954, there is disclosed a similar continuous film projector into which a position-correcting servo system has been incorporated. This serves to effect a substantial reduction in the percision required and to increase the mechanical tolerances of the continuous film projector, while retaining all its advantages. This servo system also compensates automatically for the adverse effects of film displacement in the continuous projector.

It is another object of this invention to simplify projectors of the type just described.

The present invention employs merely two oscillating mirrors as compensating reflectors which alternate with each other to accomplish the function of the plurality of rotating mirrors of the above-described projectors. In accordance with the invention, a servo system is also utilized to provide all the advantages inherent in the improved projector of the pending application of Graham and Mattke, as discussed above. The present invention has the further advantage of requiring fewer and simpler parts in its construction. This great reduction in mechanical complexity obviously makes the projector of the present invention not only cheaper and easier to construct, but cheaper, easier, and more efficient to operate and to maintain.

This projector, in an important example of practice, may also be used as a scanner of continuously moving motion picture film for television purposes. Ordinarily, the television scansion of motion picture film presents considerable difficulty in that the motion picture standard is 24 frames per second as compared with the television standard of 30 frames or 60 fields per second. The present invention, like those of the pending applications, by virtue of its non-intermittent operation, avoids the consequencies of this dissimilarity. In one illustrative embodiment of this example of practice, the viewing screen is replaced by the luminescent screen of a cathode-ray tube, the cathode beam of which is caused to scan the screen in any desired manner to form a scanning pattern or raster. This pattern is projected on the frames of a continuously moving motion picture film, thereby scanning the frames of the film, element by element. The transmitted light is directed to a photoelectric device wherein corresponding television image currents are produced.

The invention will be more fully understood from the following detailed description of certain illustrative embodiments thereof taken in connection with the accompanying drawings, in which:

Fig. 3 shows, partially in section, the mechanical design of the mirror actuating device forming part of the embodiment shown in Fig. 2;

Fig. 4 is a schematic representation of a servo system in accordance with the invention; and Fig. 5 show in greater detail a portion of the arrangement of Fig. 4.

Figure 1:
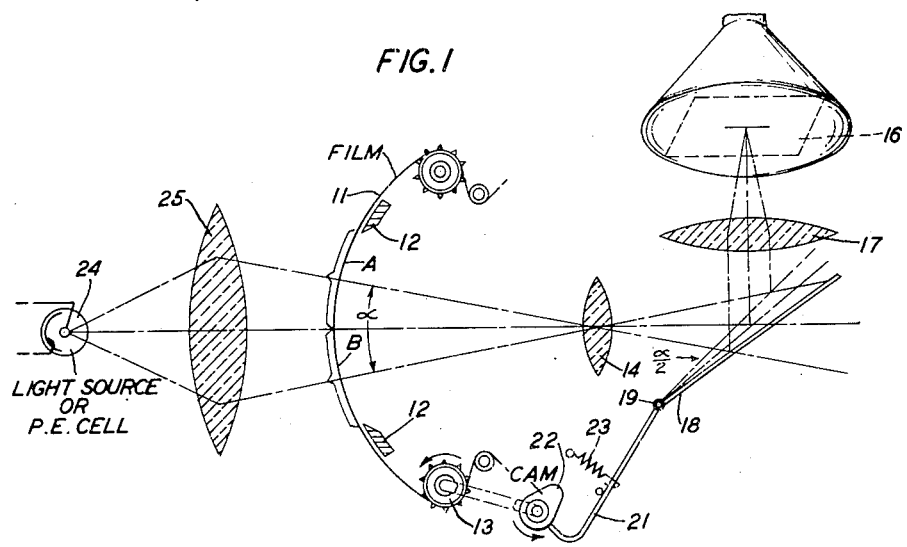
Fig. 1 is a schematic representation of an arrangement which may be used either as a motion picture film projector or a television spot scanner and which illustrates the principles involved in the invention.

Referring more specifically to the drawings, Fig. 1 shows a motion picture film 11 moved down at a uniform rate over a curved gate 12 by a film drive sprocket 13. At the center of curvature of the gate there is located the nodal point of an objective lens 14. The focal length of the lens is equal to the radius of curvature of the gate. A screen 16 (which, in accordance with the invention, can be either the screen of a cathode-ray tube or a picture projection screen) is located at the focal plane of a second objective lens 17. The two lenses 14 and 17 are located on the same optic axis, which axis passes through and is common to both lenses and a pivotable compensating reflector 18 so that the rays of light from one lens are intercepted by the other. The pivotable reflector 18 between the lenses 14 and 17 can be rotated on pivot 19. The arrangement is such that when the compensating reflector 18 and the film 11 are stationary, an image of the film frames in the gate will fall on the screen. In this particular illustrative embodiment of the invention, the height of the gate is equal to about 2½ film frame heights. The ratio of image sizes is obviously equal to the ratio of the focal lengths of the lenses.

If the angle subtended by two film frames in the gate is designated as $\alpha$ (as shown in Fig. 1), it can readily be shown that in order to superimpose the images of successive film frames on the screen (or to have the cathode-ray tube screen image follow the motion of the film frames in the gate), it is necessary to move the compensating reflector 18 about the pivot 19 through an angle $$\frac{\alpha}{2}$$

This maintains the central rays of the two film frames A and B parallel to the axial ray of the second lens, between the second lens and the compensating reflector.

The movement of the compensating reflector 18 is caused by the cam 22 which is coupled to the film drive sprocket 13 and which drives the cam follower arm 21 attached to the reflector 18. A spring 23 biases the cam follower arm 21.

The optical system is completed by a light source or photoelectric cell 24 (depending on how the arrangement is used) and a condensing lens 25. By means of these two elements, light is either (1) applied to the film frames A and B if the device is being used as a projector or (2) to the photocell 24 if the arrangement is being used as a recorder.

Figure 2:
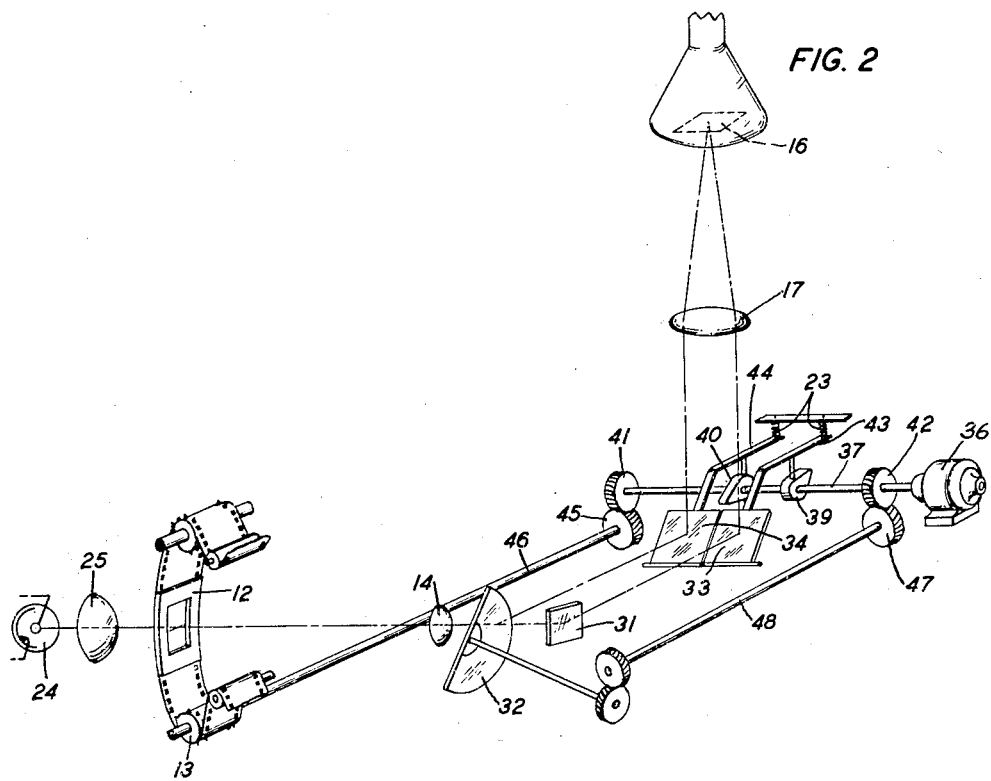
Fig. 2 is a schematic representation of an illustrative embodiment of a projector mechanism in accordance with the invention.

In the schematic diagram shown in Fig. 2 of an illustrative embodiment of a projector mechanism in accordance with the invention, there is illustrated, in addition to the elements shown in Fig. 1, a fixed reflector 31 and a semicircular rotatable reflector 32. Also shown in Fig. 2 are two compensating reflectors 33 and 34, with individual cams 39, 40 and followers 43, 44 instead of the one compensating reflector of Fig. 1. When the semicircular reflector 32 is rotated in synchronism with the film drive sprocket (one rotation of the reflector shaft for each two film frames passing through the gate 12 by suitable gearing), the rays from the first objective 14 are alternately directed first toward one of the compensating reflectors 33 and 34, then toward the other. This alternating of the rays allows each of the compensating reflectors 33 and 34 to return to the starting position while the other is active. Also shown in Fig. 2 is a driving motor 36, which is coupled to the main shaft 37 on which the cams 39 and 40 and two gears 41 and 42 are mounted. One gear 41 drives the film drive sprocket 13 (by means of gear 45 and shaft 46) and the other gear 42 drives the rotating reflector 32 (by means of gear 47 and shaft 48). The elements in Fig. 2 which are identical with those shown in Fig. 1 have been numbered in a corresponding manner, a practice which is followed herein in regard to all the several figures.

In order to illustrate the operation of the system, it will be helpful to describe the mechanical design of the mechanism for actuating the compensating reflectors of one particular version of the invention, although it is obvious that many other particular designs, all within the scope of the invention, are thoroughly feasible and perhaps, in some situations, considerably to be preferred. Fig. 3 illustrates one such suitable mechanism and shows, in addition to the cam followers 43 and 44 of Fig. 2, duplicate follower arms on the opposite side of the cam. This duplication is intended to provide mechanical balance of the follower arms, since, for standard film frame speeds of 24 frames per second, the cam shaft is required to rotate at 720 revolutions per minute, necessitating a high degree of balance for quiet operation. The compensating reflector 33 of Fig. 3 is not mounted directly on a pivotable base, but instead is mounted on a second base 63, which second base is pivotably mounted on the first base 64. The rotation of the first base 64 is caused by the cam 40 and follower 44 acting through a push rod 65, the pivoting occurring at the point marked 61 in the figure. The pivoting of the second base 63 occurs at the point marked 62, and, 62 being part of base 64, moves with it. The motion of base 63 is controlled electrically by a moving coil 82 and magnetic structure arrangement 67. This moving coil is attached to the second base 63 at a position central with the pivot of the first base 64, and the magnetic structure 67 is mounted in a fixed position on the frame 68 of the housing. During the operation of the mechanism, the first base 64 rocks about point 61, and at the same time, the moving coil 82 attached to the second base 63 oscillates in the gap in the magnetic unit 67.

For complete balancing of the moving reflector system, a second arm 69 is added to the opposite side of the cam. The cams, followers, springs, gears, balancing arms, and other elements of the mechanism are enclosed in an oil-tight housing. To insure complete tightness, a diagram-type seal 66 made of a suitable synthetic rubber is provided, in this particular embodiment of the invention, at the arm end of the push rod.

The moving coil 82 which was mentioned above is an element in a servo control system which is used in accordance with the invention to maintain vertical positioning of the respective optical images, either on the film or on the screen, according to the manner in which the invention is being utilized. A simple illustration of an exemplary embodiment of the complete servo system and its various components is shown in Fig. 4. Although certain variations of this particular servo arrangement are in accordance with the practice of the invention, the servo system of Fig. 4 is to be understood to be a general illustration and is not confined to use in conjunction with the very specific mechanism of Fig. 3.

In Fig. 4, there is shown a light source 71 illuminating the area around a sprocket hole 72 through a prism 73. It is not essential to the invention that a sprocket hole be used as the reference, but for simplicity of exposition, the invention is herein described in terms of sprocket hole reference. For a discussion of this subject, attention is invited to the exposition in the aforementioned application of Graham and Mattke. Fig. 4 is partially schematic as the mirror 18 is actually positioned between the lenses 14 and 17. By means of two lenses 14 and 17, an image of the edge of the sprocket hole is formed at a pair of slits 78 and 79 in a slit plate 74, behind which are placed two photoelectric cells 76 and 77. (In Fig. 5 the slits 78 and 79 and the photoelectric cells 76 and 77 are shown in greater detail.) An error signal caused by a vertical motion of the sprocket hole image causes a signal to be impressed on moving coil 82 through the amplifier 81, resulting in a motion of the compensating reflector 18. This motion of the reflector corrects both the positional error of the sprocket hole image and of the picture image. Since the details of the servo system are substantially the same as those of the servo which is employed in the above-mentioned pending application of Graham and Mattke, it is not considered essential to an understanding of the invention to describe this system in greater detail herein.

It is obvious that various changes can be made in the embodiment described without departing from the spirit of the invention as indicated by the claims.

What is claimed is:

1. An optical image producing device comprising a first objective lens and a second objective lens, means for directing light rays moving in one coordinate direction through said first lens whereby said moving light rays change their angles of incidence with respect to said first lens in said one coordinate direction, a pair of reflecting means positioned between said first lens and said second lens for transferring said moving light rays from said first lens to said second lens, each of said reflecting means of said pair oscillatable about a set of pivots whose axes of oscillation are in a single line perpendicular to the plane defined by said light rays moving in said one coordinate direction, further reflecting means positioned between said first objective lens and said pair of reflecting means for applying said moving light rays from said first lens first to one of the reflecting means of said pair of reflecting means and then to the other, and means for oscillating each one of the reflecting means of said pair of reflecting means about its axis of oscillation to maintain said moving light rays applied to said second lens at a constant angle of incidence in said one coordinate direction.

2. An optical image producing device according to claim 1, in which each one of the reflecting means of said pair of reflecting means is driven by an individual cam mechanism.

3. The combination of elements as in claim 1 in which said further reflecting means includes a rotatable semicircular mirror for intercepting light rays from said first lens and for reflecting it to one of said pairs of reflecting means during one-half of every rotation thereof and an additional plane mirror for reflecting said light rays to the second of said pair of reflecting means during each half rotation of said semicircular mirror that it is not intercepting said light rays from said first lens.

4. An optical image producing device comprising a first objective lens and a second objective lens, means for projecting light rays indicative of a moving image through said first lens whereby light rays representing a given part of said image change their angles of incidence with respect to said first lens in parallel planes of incidence defined by the direction of motion of said moving image, a pair of pivotally mounted reflecting means positioned between said first lens and said second lens for transferring said light rays from said first lens to said second lens, each one of the reflecting means of said pair having its axis of oscillation perpendicular to said parallel planes of incidence, further reflecting means positioned between said first objective lens and said pair of reflecting means for applying said light rays from said first lens first to one of the reflecting means of said pair of reflecting means and then to the other, and means for oscillating each one of the reflecting means of said pair about its axis to maintain the rays applied to said second lens at a constant angle of incidence in parallel planes of incidence perpendicular to said axes of oscillation.

5. An optical image producing device comprising a first objective lens and a second objective lens, means for projecting light rays indicative of a moving image through said first lens whereby light rays representing a given part of said image change their angles of incidence with respect to said first lens at a substantially constant rate in parallel planes of incidence defined by the direction of motion of said moving images, a pair of pivotally mounted reflecting means positioned between said lenses for transferring said light rays from said first lens to said second lens, and oscillatable about a first set of pivots whose axes of oscillation are in one line and a second set of pivots whose axes are in a second line, said lines of axes being parallel to each other and perpendicular to said parallel planes of incidence, each one of the reflecting means of said pair of reflecting means being displaced from one another along said lines, further reflecting means positioned between said first objective lens and said pair of reflecting means for directing said light rays from said first lens first to one of the reflecting means of said pair of reflecting means and then to the other, means for deriving a signal varying in accordance with variations in the rate of change of the angles of incidence of said light rays, and means for oscillating each one of the reflecting means of said pair about said axes of oscillation to maintain the rays applied to said second lens at a constant angle in parallel planes of incidence, said oscillating means comprising individual cam mechanisms for driving each of the reflecting means of said pair of reflecting means at a constant rate about said first set of pivots, and electromagnetic means activated by said varying signal for driving each of the reflecting means of said pair at a varying rate about said second set of pivots.

6. An optical image producing device comprising a first objective lens and a second objective lens, means for projecting moving light rays through said first lens whereby said moving light rays change their angles of incidence with respect to said first lens in one coordinate direction, a pair of reflecting means positioned between said lenses and oscillatable about a first set of pivots whose axes of oscillation are in one line and a second set of pivots whose axes of oscillation are in a second line, said lines of axes being parallel to each other and perpendicular to the plane defined by said light rays moving in one coordinate direction, each one of the reflecting means of said pair being displaced from one another along said lines, further reflecting means positioned between said first objective lens and said pair of reflecting means for directing said rays from said first lens first to one of the reflecting means of said pair of reflecting means and then to the other, means for deriving a signal varying in accordance with variations in the rate of change of the angles of incidence of said light rays, means for oscillating each one of the reflecting means of said pair at a constant rate about said first set of pivots to maintain the rays applied to said second lens at a constant angle of incidence in one coordinate direction, and means for oscillating each one of the reflecting means of said pair at a varying rate about said second set of pivots, to correct for variations in the rate of change of the angles of incidence of said light rays in said one coordinate direction.

References Cited in the file of this patent

UNITED STATES PATENTS

| 648,019 | Britain | Apr. 24, 1900 |
| 1,246,217 | Anderson | Nov. 13, 1917 |
| 1,309,673 | Wescott | July 15, 1919 |
| 1,485,195 | Messter | Feb. 26, 1924 |
| 1,856,541 | Decaux | May 3, 1932 |
| 2,305,838 | Beer | Dec. 22, 1942 |

FOREIGN PATENTS

| 338,909 | Germany | July 6, 1921 |
| 395,120 | Germany | May 19, 1924 |